United States Patent
Kim (10) Patent No.: US 7,362,968 B2
(45) Date of Patent: Apr. 22, 2008

(54) COMBINATION CAMERA AND DSC LENS CONTROL METHOD USING THE SAME

(75) Inventor: Kuie-sup Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 429 days.

(21) Appl. No.: 11/062,623

(22) Filed: Feb. 23, 2005

(65) Prior Publication Data

US 2005/0200708 A1 Sep. 15, 2005

(30) Foreign Application Priority Data

Mar. 10, 2004 (KR) ............... 10-2004-0016055

(51) Int. Cl.
 G03B 7/26 (2006.01)
 G03B 17/48 (2006.01)
 H04N 5/225 (2006.01)

(52) U.S. Cl. ............ 396/280; 396/348; 396/429; 348/220.1

(58) Field of Classification Search ............. 396/301, 396/348, 349, 429, 280, 333; 348/64, 220.1, 348/372
See application file for complete search history.

(56) References Cited

U.S. PATENT DOCUMENTS 6,096,969 A * 8/2000 Fujita et al. ............... 136/259

2003/0020814 A1 1/2003 Ono

FOREIGN PATENT DOCUMENTS

| EP | 1 422 932 A2 | 5/2004 |
|---|---|---|
| EP | 1 480 452 A1 | 11/2004 |
| JP | 09 186913 A | 7/1997 |
| KR | 1996-0001856 | 1/1996 |
| KR | 1999-0049031 | 7/1999 |

OTHER PUBLICATIONS

Grunin, Lori; "Samsung SCD5000 DuoCam", Jul. 22, 2003, CNET Reviews, 3 pages. (http://reviews.cnet.com/digital-camcorders/samsung-scd5000-duocam/4505-6500_7-20791289.html).*

* cited by examiner

Primary Examiner—W. B. Perkey
Assistant Examiner—Rishi Suthar
(74) Attorney, Agent, or Firm—Roylance, Abrams, Berdo and Goodman, LLP (57) ABSTRACT

A combination camera and a DSC lens control method using the same, including a lens position check unit for checking a position of a DSC lens if electric power is applied, and a switching unit for switching the DSC lens to a closed state if the lens position check unit decides that the DSC lens is open. Thus, if the power is applied in the DVC mode after the combination camera is turned off when the DSC lens has been open, the combination camera can efficiently switch the DSC lens to the closed state to thereby eliminate a user's inconvenience of using the DVC picture-taking mode during the open state of the DSC lens, or the inconvenience of switching the mode to the DSC image-capturing mode to close the DSC lens and then switching the mode to the DVC picture-capturing mode for use.

14 Claims, 4 Drawing Sheets

COMBINATION CAMERA AND DSC LENS CONTROL METHOD USING THE SAME

CROSS-REFERENCE TO RELATED APPLICATIONS

This application claims the benefit under 35 U.S.C. §119 (a) of Korean Patent Application No. 10-2004-0016055 filed on Mar. 10, 2004, the entire disclosure of which is hereby incorporated by reference.

BACKGROUND OF THE INVENTION

1. Field of the Invention

The present invention relates to a combination camera and a digital still camera (DSC) lens control method using the same. More particularly, the present invention relates to a combination camera and a DSC lens control method capable of switching the DSC lens to a closed state when electric power cuts off while the DSC lens is open.

2. Description of the Related Art

In general, a digital still camera (DSC) converts an image focused through a lens into a digital signal, and stores the digital signal in a recording medium such as a hard disc, a memory card, and other such devices. That is, the digital still camera converts a taken image into a digital signal, stores the taken image in a recording medium such as a hard disc, a memory card, and other such devices, rather than recording the taken image in film, and even when transferring the stored image to a digital device such as a computer, directly sends the stored image to the digital device without digitization of the stored image through a scanner or the like. In particular, the DSC has a high compatibility with a personal computer to thereby facilitate the editing and manipulation of the transferred image. Further, the DSC has a structure similar to general cameras, so one can easily carry the DSC with him or her. Such a DSC typically has a lens unit, a memory unit, a signal conversion unit, a display unit, and so forth, and is mainly used to capture still images due to the limited capacity of a recording medium for storing images. That is, in general, the DSC can have a function enabling one to take moving pictures for a limited period of time, but not for a substantially long period of time. In order to overcome such a drawback to the DSC, the digital video camera (DVC) is more widely used for recording moving pictures of an object on a recording medium such as a magnetic tape or a hard disc, and reproducing the recorded moving pictures.

The DVC typically has a lens unit, a signal conversion unit, a deck unit for recording and reproducing taken moving pictures, a display unit, and so forth. Further, the DVC has a microphone unit and a speaker unit, and can record moving pictures in the built-in recording medium for over one hour. However, the DVC can also be used to capture still images, but the captured still images are not as good in quality when compared to ones taken by the DSC. Accordingly, the DVC is mainly used to take moving pictures. Further, since the DVC has more functions and a more complicated structure than the DSC, the DVC can be relatively bulky in size and higher in price.

Thus, one currently has to purchase both products to use the respective functions of the DSC and DVC as stated above, which requires consumers to spend more money as well as creating inconveniences since one has to carry both products to use all of the functions of both the DSC and DVC.

In order to overcome such problems, the DSC-combined DVC, which is a device combining the DSC with the DVC in one case, has been developed and is referred to as 'digital camera/camcorder', 'combination camera', or 'DuoCam' for short.

However, the above combination camera needs a separate method for switching the DSC lens to a closed state, since, if the electric power of the combination camera cuts off when the DSC lens is open and is then applied in the DVC mode, the combination camera still has an open DSC lens, even when used in the DVC mode.

Accordingly, a need exists for a control method that is capable of switching a DSC lens to a closed state when electric power is cut off while the DSC lens is open.

SUMMARY OF THE INVENTION

The present invention has been developed in order to solve the above drawbacks and other problems associated with the conventional arrangement. An aspect of the present invention is to provide a combination camera and a DSC lens control method using the same that is capable of switching the DSC lens to a closed state when electric power of the combination camera is applied in the DVC mode after the power is turned off while the DSC lens of the combination camera is open.

The foregoing and other objects and advantages are substantially realized by providing a combination camera combining both a digital still camera (DSC) and a digital video camera (DVC), comprising a lens position check unit for checking a position of a DSC lens if electric power is applied, and a switching unit for switching the DSC lens to a closed state if the lens position check unit decides that the DSC lens is open.

Preferably, the combination camera further comprises an operation mode decision unit for deciding an operation mode of the DSC or the DVC, wherein the switching unit switches the DSC lens to the closed state if the operation mode decision unit decides that the operation mode is currently that of the DVC.

If the operation mode decision unit decides that the operation mode is currently that of the DVC, the switching unit preferably turns off the electric power to the DSC and the DSC lens.

The objects and advantages are further substantially realized by providing a DSC lens control method for a combination camera, wherein the method comprises the steps of (a) checking a position of a DSC lens if electric power is applied to the combination camera combining both a digital still camera (DSC) and a digital video camera (DVC), and (b) switching the DSC lens to a closed state if the DSC lens is decided to be open.

Preferably, the DSC lens control method further comprises a step of (c) deciding if an operation mode is currently that of the DSC or the DVC, wherein the step (b) switches the DSC lens to the closed state if the step (c) decides that the operation mode is currently that of the DVC.

Preferably, the DSC lens control method further comprises a step of (d) turning off the electric power applied to the DSC and the DSC lens if the step (c) decides that the operation mode is currently that of the DVC.

The foregoing and other objects and advantages are further substantially realized by providing a combination camera combining both a digital still camera (DSC) and a digital video camera (DVC) comprising a storage unit for storing an open or closed state of a DSC lens while in an operation mode of the DSC, a state decision unit for deciding the state of the DSC lens through the storage unit if electric power is applied while in an operation mode of the DVC, and a switching unit for switching the DSC lens to a closed state if the state decision unit decides that the DSC lens is open.

The storage unit is preferably implemented in an electrically erasable and programmable ROM (EEPROM).

Further, the switching unit preferably switches the DSC lens to the closed state by applying the electric power to the DSC.

The objects and advantages are further substantially realized by providing a DSC lens control method for a combination camera, wherein the method comprises steps of (a) storing an open or closed state of a DSC lens while in an operation mode of the DSC of the combination camera combining both a digital still camera (DSC) and a digital video camera (DVC), (b) deciding the state of the DSC lens based on information stored in the step (a) if electric power is applied while in an operation mode of the DVC, and (c) switching the DSC lens to the closed state if the step (b) decides that the DSC lens is open.

The step (a) preferably stores the open or closed state of the DSC lens in an EEPROM.

Preferably, the step (c) switches the DSC lens to the closed state by applying the electric power to the DSC.

Therefore, the combination camera according to the present invention can efficiently control the DSC lens when the electric power is applied while in the DVC mode after the power is turned off when the DSC lens has been open.

BRIEF DESCRIPTION OF THE DRAWINGS

The above aspects and features of the present invention will become more apparent by describing certain embodiments of the present invention with reference to the accompanying drawings, in which.

Throughout the drawings, like reference numerals will be understood to refer to like parts, components and structures.

DETAILED DESCRIPTION OF EXEMPLARY EMBODIMENTS

Hereinafter, a description will be made in detail of a combination camera and a DSC lens control method using the same with reference to the accompanying drawings. In the following description, same drawing reference numerals are used for the same elements even in different drawings. The matters defined in the description, such as detailed construction and element descriptions, are provided to assist in a comprehensive understanding of the invention. Also, functions or constructions well known to those skilled in the art are omitted for clarity and conciseness.

Figure 1:
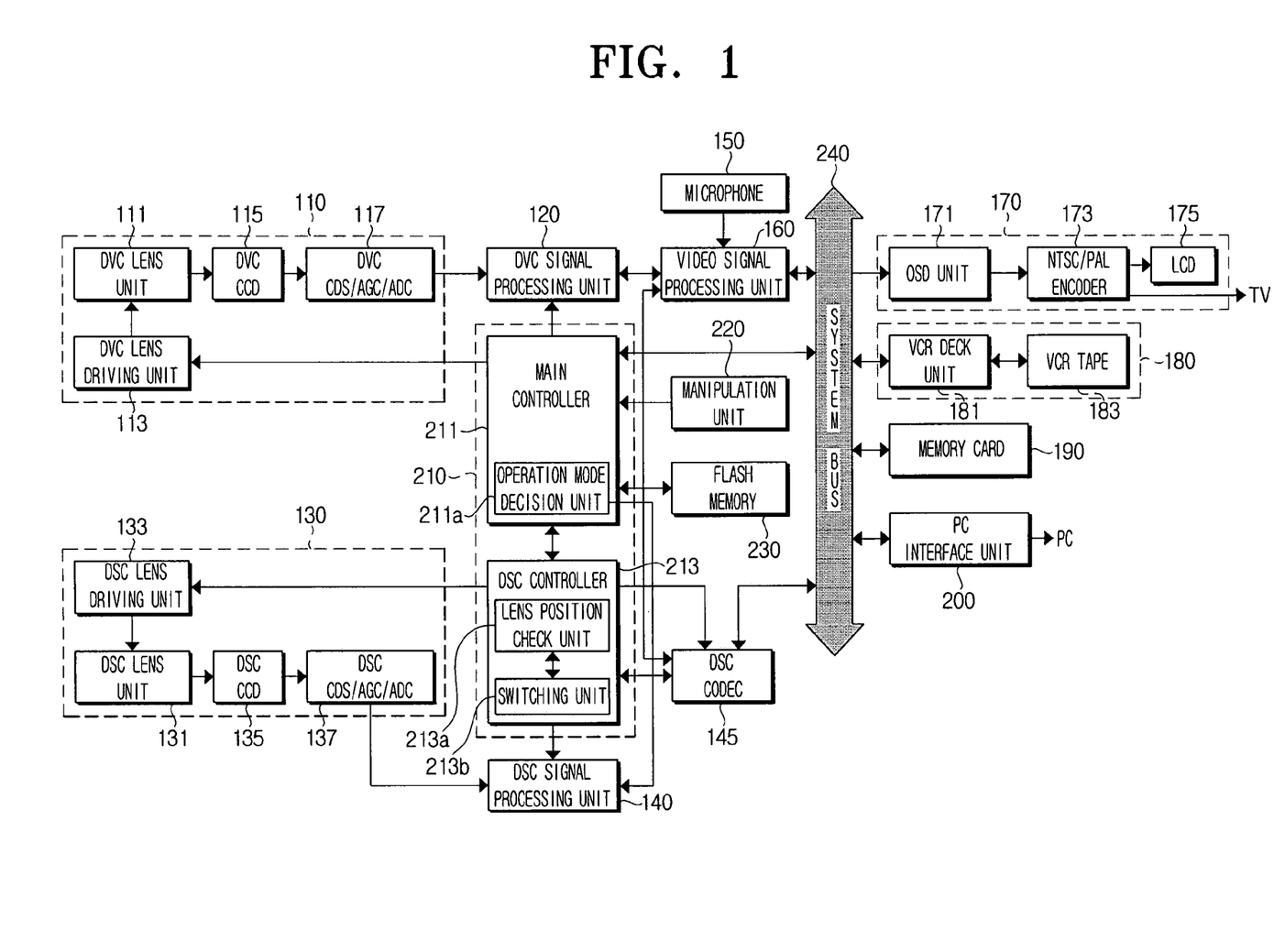
FIG. 1 is a block diagram for showing a combination camera according to an embodiment of the present invention.

FIG. 1 is a block diagram for showing a combination camera according to an embodiment of the present invention. In FIG. 1, the combination camera has a digital video camera (DVC) picture-taking part 110, a DVC signal processing unit 120, a digital still camera (DSC) image-capturing part 130, a DSC signal processing unit 140, a DSC encoder/decoder (CODEC) unit 145, a microphone 150, a video signal processing unit 160, a display part 170, a video cassette recorder (VCR) part 180, a memory card 190, a PC interface unit 200, a control part 210, a manipulation unit 220, a flash memory 230, and a system bus 240.

The DVC picture-taking part 110 uses a photoelectric conversion to convert an optical signal coming in through a lens into an electric signal, and performs certain signal processing on the converted signal. The DVC picture-taking part 110 can take both moving pictures and still images. However, the still images captured by the DVC picture-taking part 110 have poor image quality when compared to the still images captured by the DSC image-capturing part 130, which will be described in greater detail below. Thus, the DVC picture-taking part 110 is mainly used to take moving pictures.

The DVC picture-taking part 110 is provided with a DVC lens unit 111, a DVC lens driving unit 113, a DVC charge coupled device (CCD) unit 115, and a DVC correlated double sampler (CDS)/auto gain controller (AGC)/analog-to-digital converter (ADC) 117.

The DVC lens driving unit 113 drives the DVC lens unit 111 according to the controls of the control part 210. In detail, the DVC lens driving unit 113 zooms the DVC lens unit 111 in and out according to the controls of the control part 210, automatically controls the focal point, and controls the opening and closing of an iris provided over the DVC lens unit 111.

The DVC CCD unit 115 converts an optical image focused through the DVC lens unit 111 into an electric signal output. That is, an optical image of an object is focused on the photosensitive surface of the DVC CCD unit 115 by the DVC lens unit 111, and the DVC CCD unit 115 converts the optical image focused on the photosensitive surface into an electric signal, and then outputs an electric signal in the one-dimensional form by horizontal and vertical scanning.

The DVC CDS/AGC/ADC 117 removes noise from a signal output from the DVC CCD unit 115 by using the correlated double sampler (CDS), controls a gain by using the automatic gain controller (AGC) in order to maintain a constant signal level, and converts the signal into a digital signal by using the analog-to-digital converter (ADC).

The DVC signal processing unit 120 performs certain signal processing on a signal applied from the DVC picture-taking part 110, and applies the signal to the video signal processing unit 160. In detail, the DVC signal processing unit 120 separates the applied signal into a luminance signal and a chrominance signal, carries out gain adjustment, outline correction, and automatic white balance (AWB), and the like, and changes resolution.

The microphone 150 converts sound coming from an exterior source into an electric signal.

The video signal processing unit 160 applies a video signal processed in the DVC signal processing unit 120 to the display part 170. The video signal processing unit 160 inputs from the control part 210 a user's 'picture-taking or image-capturing command' that is input through the manipulation unit 220, and compresses an output signal of the DVC signal processing unit 120 into a signal having a DV format according to the input picture-taking or image-capturing command.

Further, the video signal processing unit 160 converts an output signal of the microphone 150 into a digital signal, and compresses the converted signal into a signal having a PCM format. The video signal processing unit 160 applies the compressed signal to the VCR part 180 for recording according to the controls of the control part 210.

If the combination camera operates in the 'VCR reproducing mode', the video signal processing unit 160 inputs the compressed video signal from the VCR part 180 for reproducing according to the controls of the control part 210. Further, the video signal processing unit 160 decompresses and applies the compressed input video signal to the display part 170.

The DSC image-capturing part 130 uses a photoelectric conversion to convert an optical signal coming in through the lens into an electric signal and carries out certain signal processing on the converted signal. The DSC image-capturing part 130 can take both moving pictures and still images. However, the data size for a moving picture taken by the DSC image-capturing part 130 is much larger than that for a moving picture taken by the DVC picture-taking part 110. Thus, the data for the moving picture needs substantially more storage space when stored in a recording medium and it becomes difficult to take moving pictures for a long period of time. Accordingly, the DSC image-capturing part 130 is mainly used to capture still images.

The DSC image-capturing part 130 has a DSC lens unit 131, a DSC lens driving unit 133, a DSC CCD unit 135, and a DSC CDS/AGC/ADC 137.

The DSC lens driving unit 133 drives the DSC lens unit 131 according to the controls of the control part 210. In detail, the DSC lens driving unit 133 zooms the DSC lens unit 131 in and out according to the controls of the control part 210, automatically controls a focal point, and adjusts the opening or closing amount of the iris (not shown) provided over the DSC lens unit 131. The DSC lens zooms in to take an enlarged picture of an object, and zooms out to take a regular picture of the object. The 'DSC lens open state' refers to a combined state of the zoom-in and zoom-out of the DSC lens for taking pictures of an object by using the DSC image-capturing part 130 of a combination camera, and the 'DSC lens closed state' refers to a shut state preventing the taking of pictures of an object by using the DSC image-capturing part 130.

The DSC CCD unit 135 converts an optical image coming in through the DSC lens unit 131 into an electric signal for output.

The DSC CDS/AGC/ADC 137 removes noise from a signal output from the DSC CCD unit 135 by using the CDS, controls a gain in order to maintain a constant signal level by using the AGC, and converts the signal into a digital signal by using the ADC.

The DSC signal-processing unit 140 carries out certain signal processing on a signal input from the DSC image-capturing part 130. In detail, the DSC signal-processing unit 140 separates an input signal into a luminance (Y) signal and a chrominance (C) signal, performs gain adjustment, outline correction, AWB, and the like, and changes resolution.

The DSC CODEC 145 applies a video signal processed in the DSC signal-processing unit 140 to the display part 170.

If the DSC CODEC 145 receives from the control part 210 a user's 'taking-picture command' that is input through the manipulation unit 220, the DSC CODEC 145 compresses an output signal of the DSC signal-processing unit 140 into a signal having a JPEG format. Further, the DSC CODEC 145 stores the compressed signal in the memory card 190 according to the controls of the control part 210.

If the combination camera operates in the 'memory card reproducing mode', the DSC CODEC 145 receives a compressed video signal from the memory card 190 for reproducing according to the controls of the control part 210. Further, the DSC CODEC 145 decompresses and applies the input compressed video signal to the display part 170.

The display part 170 displays images output from the video signal processing unit 160 and the DSC CODEC 145. To perform such a function, the display part 170 fef can have an On Screen Display (OSD) unit 171, a National Television System Committee/Phase Alternation Line (NTSC/PAL) encoder 173, and a Liquid Crystal Display (LCD) unit 175.

The OSD unit 171 stores OSD characters, GUI data such as menu views necessary to build Graphic User Interface (GUI) environment, and so forth. The OSD unit 171 can add the OSD characters or the GUI data to an image output from the video signal processing unit 160 and the DSC CODEC 145 according to the controls of the control part 210.

The NTSC/PAL encoder 173 converts a video signal of the OSD unit 171 into a video signal of NTSC format or PAL format, and applies the converted video signal to the LCD unit 175 or an external TV.

The LCD unit 175 is a display device for displaying images applied from the NTSC/PAL encoder 173.

The VCR part 180 records a video signal output from the video signal processing unit 160, or reads and applies the recorded video signal to the video signal processing unit 160. The VCR part 180 has a VCR deck unit 181 and a VCR tape 183.

The VCR tape 183 is a magnetic recording medium for recording a video signal thereon, and can be inserted into or ejected from the VCR deck unit 181.

The VCR deck unit 181 records a video signal from the video signal processing unit 160 on the VCR tape 183, or reads and applies a video signal of the VCR tape 183 to the video signal processing unit 160.

The memory card 190 is a recording medium for recording a video signal of the DSC CODEC 145 therein, and can be inserted into and removed from the combination camera.

The PC interface unit 200 interfaces with an external personal computer (PC) or a printer (not shown).

The control part 210 controls the overall operations of the combination camera according to a user's manipulation commands that are input through the manipulation unit 220. In particular, the control part 210 controls either of the DVC picture-taking part 110 and the DSC image-capturing part 130 to take images according to a user's setting. The control part 210 has a main controller 211 and a DSC controller 213.

The main controller 211 inputs a user's manipulation commands through the manipulation unit 220 and accordingly, controls the operations of the DVC lens driving unit 113, the DVC signal processing unit 120, video signal processing unit 160, OSD unit 171, VCR deck unit 181, and PC interface unit 200. Further, the main controller 211 controls the control operations of the DSC controller 213. Furthermore, the main controller 211 includes an operation mode decision unit 211A for deciding what mode is used for the DVC picture-taking part 110 or the DSC image-capturing part 130 when electric power is applied to the combination camera. If the power is applied to the combination camera, the operation mode decision unit 211A decides whether the combination camera is in the DVC picture-taking mode or the DSC image-capturing mode when the power is initially applied.

The DSC controller 213 controls the operations of the DSC lens driving unit 133, DSC signal-processing unit 140, and DSC CODEC 145 according to the controls of the main controller 211. The DSC controller 213 has a lens position check unit 213A and a switching unit 213B.

If the power is applied to the combination camera, the lens position check unit 213A checks the position of the DSC lens. That is, if the power is applied to the combination camera, the lens position check unit 213A checks whether the DSC lens is zoomed in or out. If the DSC lens is determined to be zoomed in, the lens position check unit 213A decides that the DSC lens is open. If the DSC lens is determined to be zoomed out, the lens position check unit 213A checks whether the DSC lens is open or closed through the DSC lens unit 131. The opening or closing of the DSC lens can be checked through the opening or closing of the iris of the DSC lens unit 131.

If the lens position check unit 213A decides that the DSC lens is open, the switching unit 213B switches the DSC lens to the closed state. If the operation mode decision unit 211A decides that the operation mode of the combination camera is the DVC picture-taking mode, it is preferable that the switching unit 213B switches the DSC lens to the closed state. At this time, if the combination camera is used in the DSC image-capturing mode, the DSC lens unit 131 generally causes the DSC lens to zoom out, so it is preferable that the switching unit 213B switches the DSC lens to the zoom-out state and then to the closed state through the DSC lens driving unit 133. Further, if the lens position check unit 213A determines that the DSC lens is in the zoom-out state, it is preferable that the switching unit 213B switches the DSC lens to the closed state, keeping the DSC lens in the zoom-out state.

The flash memory 230 stores system programs, such as a booting program needed in the main controller 211, that are necessary to operate the camera, and other data and application programs which have to be maintained even during power failure.

The manipulation unit 220 is a user interface unit for inputting manipulation commands related to function selection and operation control of the combination camera.

Figure 2:
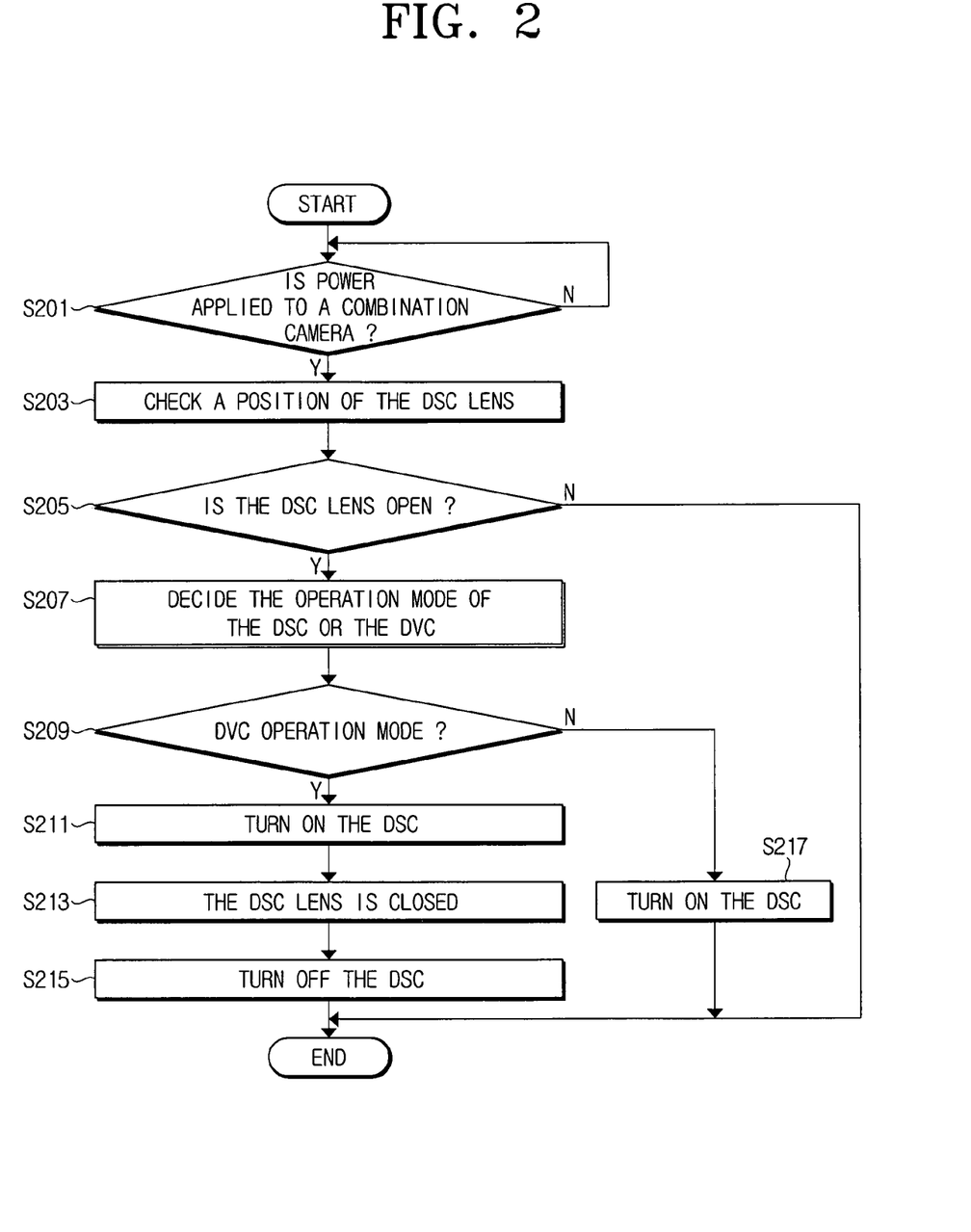
FIG. 2 is a flow chart for showing a DSC lens control method for the combination camera of FIG. 1 according to an embodiment of the present invention.

FIG. 2 is a flow chart for showing a DSC lens control method for the combination camera of FIG. 1. A description will now be made in detail of the DSC lens control method for the combination camera of FIG. 1 with reference to FIG. 2.

If the power is applied to the combination camera at step (S201), the lens position check unit 213A of the DSC controller 213 checks the position of the DSC lens through the DSC lens unit 131 or the DSC lens driving unit 133 at step (S203). The lens position check unit 213A decides whether the DSC lens has been zoomed out or in. If the DSC lens has been zoomed in, the lens position check unit 213A decides that the DSC lens is open. If the DSC lens has been zoomed out, the lens position check unit 213A decides whether the iris of the DSC lens is open or closed through the DSC lens unit 131 to thereby identify whether the DSC lens is open or closed.

If the lens position check unit 213A determines that the DSC lens is open at step (S205), the operation mode decision unit 211A decides whether the operation mode of the combination camera is in the DVC picture-taking mode or in the DSC image-capturing mode at step (S207). In the flow chart of FIG. 2, if the lens position check unit 213A decides that the DSC lens is open, the operation mode decision unit 211A is shown to then decide the operation mode of the combination camera at step (S207), however, the lens position check unit 213A can also be configured to check the position of the DSC lens after the operation mode decision unit 211A first decides the operation mode of the combination camera.

If the operation mode decision unit 211A decides that the operation mode of the combination camera is that of the DVC picture-taking mode at step (S209), the switching unit 213B of the DSC controller 213 applies the power to the DSC image-capturing part 130 at step (S211), and controls the DSC lens driving unit 133 to switch the DSC lens to the closed state at step (S213). Further, after the DSC lens is closed, the switching unit 213B turns off the power to the DSC image-capturing part 130 to conserve the power of the combination camera at step (S215).

If the DSC lens is decided to be open and the operation mode decision unit 211A decides that the operation mode of the combination camera is not that of the DVC picture-capturing mode, that is, that the operation mode of the combination camera is that of the DSC picture-capturing mode, after the power is applied to the combination camera, the operation mode decision unit 211A maintains the power applied to the DSC image-capturing part 130 so that the DSC image-capturing part 130 proceeds with capturing images at step (S217).

Figure 3:
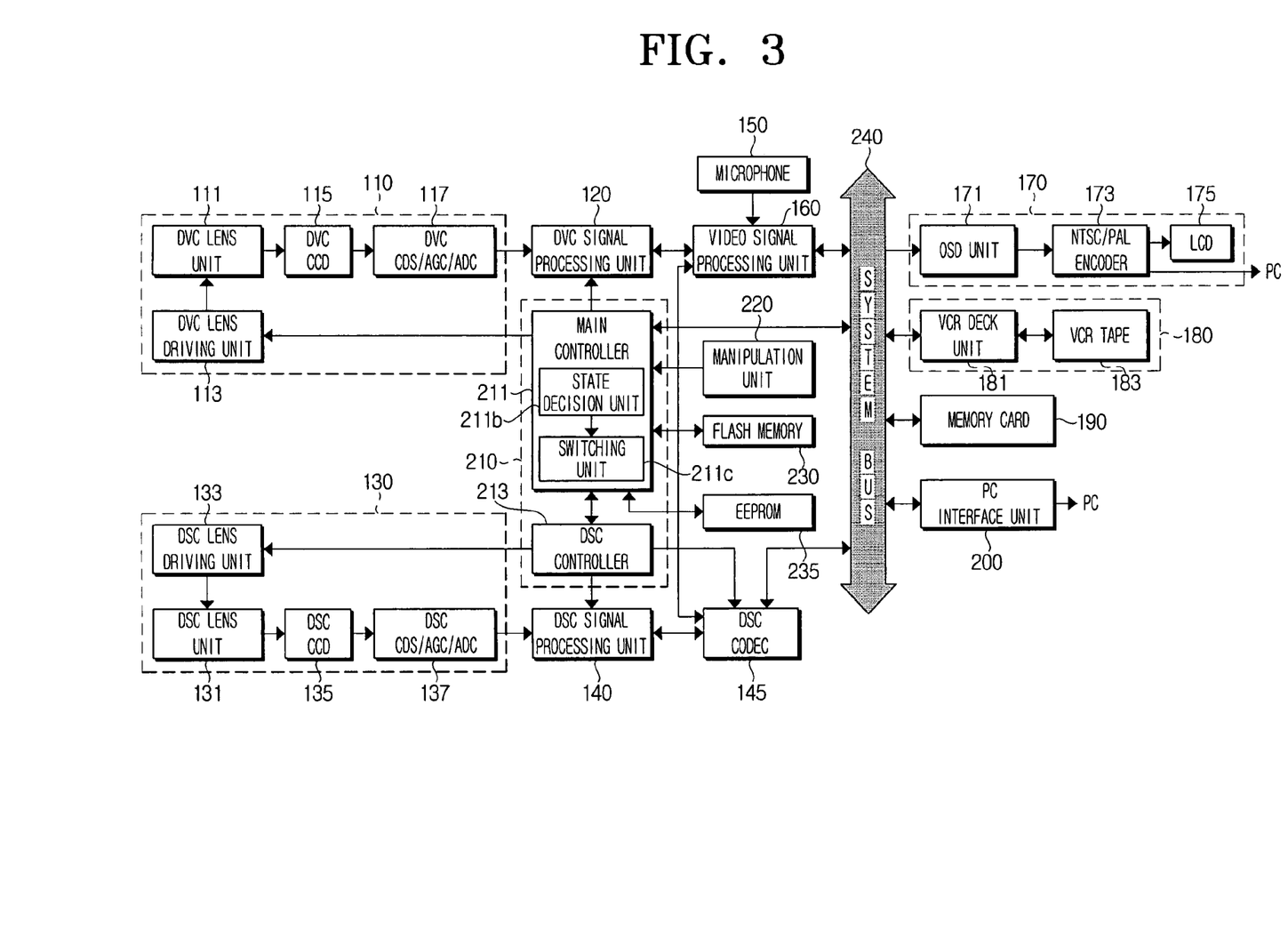
FIG. 3 is a block diagram for showing a combination camera according to another embodiment of the present invention.

FIG. 3 is a block diagram for showing a combination camera according to another embodiment of the present invention.

In FIG. 3, the combination camera has the DVC picture-taking part 110, DVC signal processing unit 120, DSC image-capturing part 130, DSC signal-processing unit 140, DSC CODEC 145, microphone 150, video signal processing unit 160, display part 170, VCR part 180, memory card 190, PC interface unit 200, control part 210, manipulation unit 220, flash memory 230, EEPROM 235, and system bus 240. For the combination camera according to the embodiment of the present invention shown in FIG. 3, like components are denoted by like reference numerals, and the operations and functions which are the same as those described above are omitted from the description below.

The main controller 211 has a state decision unit 211b and a switching unit 211c. The state decision unit 211b communicates with the EEPROM 235 when the power is applied while in the DVC operation mode, and decides whether the DSC lens is open or closed according to information stored on the EEPROM 235.

If the state decision unit 211b decides that the DSC lens is open, the switching unit 211c switches the DSC lens to the closed state.

If the combination camera operates in the DSC image-capturing mode, the EEPROM 235 stores the open or closed state of the DSC lens and the zoom-in or zoom-out state of the DSC lens. That is, if while in the DSC image-capturing mode, a user switches the DSC lens to the zoom-in or the zoom-out state or switches the operation mode of the combination camera to the DVC picture-taking mode, the EEPROM 235 stores the zoom-in or zoom-out state and the open or closed state of the DSC lens.

Figure 4:
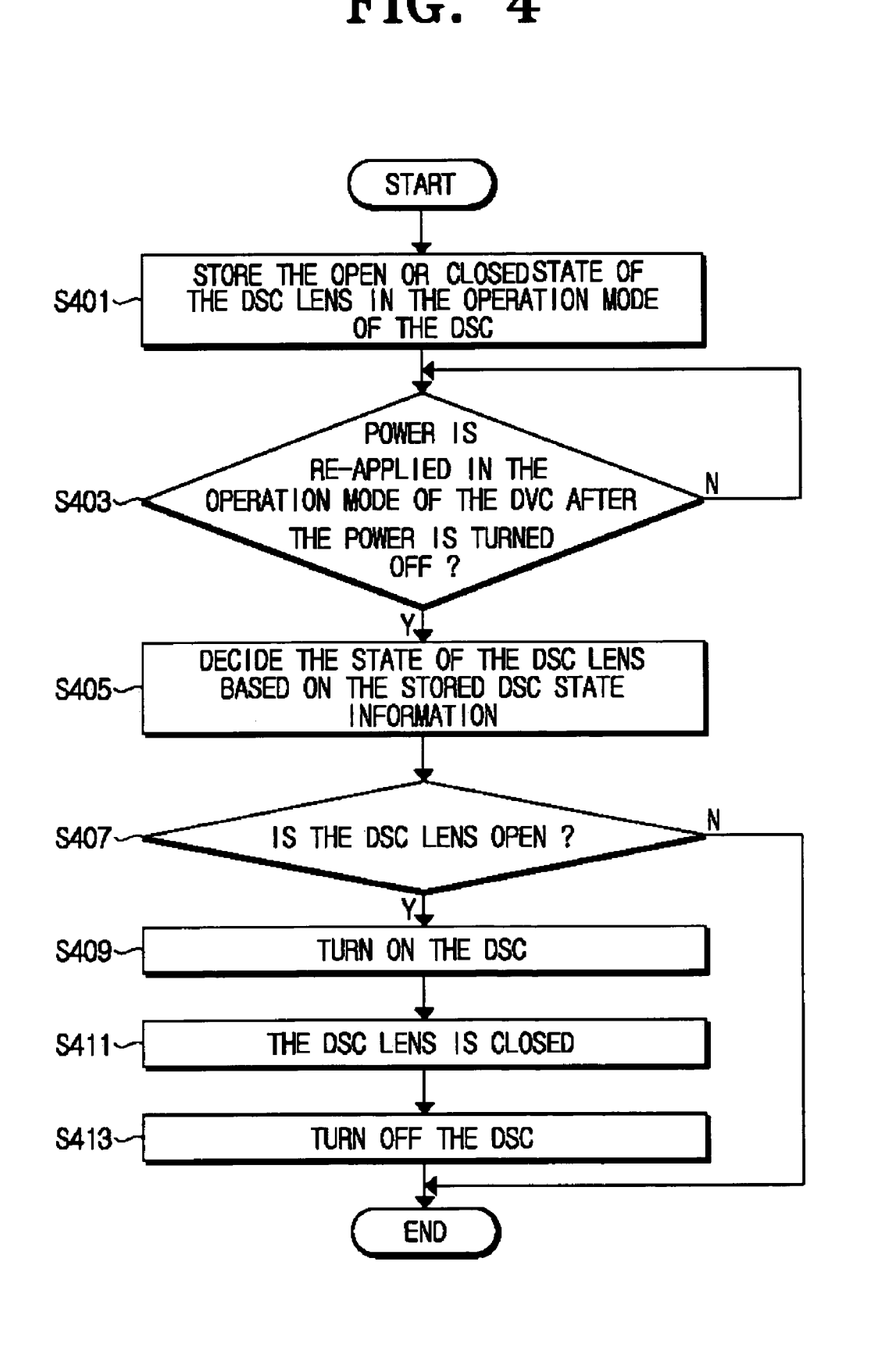
FIG. 4 is a flow chart for showing a DSC lens control method for the combination camera of FIG. 3 according to an embodiment of the present invention.

FIG. 4 is a flow chart for showing a DSC lens control method for the combination camera of FIG. 3. A description will be made in detail with reference to FIG. 4 of the operations and functions of the combination camera according to another embodiment of the present invention.

If the DSC lens is switched from the zoom-in state to the zoom-out state while in the DSC image-capturing mode of the combination camera, or if the mode of the combination camera is switched from the DSC image-capturing mode to the DVC picture-taking mode, the main controller 211 stores the zoom-in or the zoom-out state and the open or closed state of the DSC lens into the EEPROM 235 at step (S401). If the DSC lens is zoomed in, the main controller 211 decides that the DSC lens is open. If the DSC lens is zoomed out, the main controller 211 decides whether the DSC lens is open or closed through the DSC lens unit 131.

If the combination camera is turned off and then turned on in the DVC picture-capturing mode at step (S403), the state decision unit 211*b* decides the present state of the DSC lens based on the state information of the DSC lens stored in the EEPROM 235 at step (S405). That is, if the zoom-in state is stored for the DSC lens before the combination camera is turned off, the state decision unit 211*b* decides that the present state of the DSC lens is open. Further, if the DSC lens is zoomed out before the combination camera is turned off and the closed state is stored in the EEPROM 235 for the DSC lens, the state decision unit 211*b* decides that the DSC lens is closed.

If the state decision unit 211*b* decides that the DSC lens is open at step (S407), the switching unit 211*c* applies power to the DSC image-capturing part 130 at step (S409) so as to switch the DSC lens to the closed state at step (S411), and, after the DSC lens is switched to the closed state, then turns off the DSC image-capturing part 130 so as to cut off the power to the DSC image-capturing part 130 at step (S413).

Thus, according to embodiments of the present invention, if the power is applied in the DVC mode after the combination camera is turned off when the DSC lens has been open, the combination camera can efficiently switch the DSC lens to the closed state. Accordingly, the present invention can be used to thereby eliminate a user's inconvenience of using the DVC picture-taking mode during the open state of the DSC lens, or the inconvenience of switching the mode to the DSC image-capturing mode to close the DSC lens and then switching the mode to the DVC picture-capturing mode for use.

The foregoing embodiments and advantages are merely exemplary and are not to be construed as limiting the present invention. The present invention can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A combination camera combining both a digital still camera (DSC) and a digital video camera (DVC), comprising:
    a lens position check unit for checking a position of a DSC lens if electric power is applied; and
    a switching unit for switching the DSC lens to a closed state if the lens position check unit decides that the DSC lens is open when the combination camera is in a DVC picture-taking mode.

2. The combination camera as claimed in claim 1, further comprising:
    an operation mode decision unit for deciding if an operation mode comprises that of the DSC or the DVC, wherein the switching unit switches the DSC lens to the closed state if the operation mode decision unit decides that the operation mode comprises that of the DVC.

3. The combination camera as claimed in claim 2, wherein the switching unit turns off the electric power to the DSC and the DSC lens if the operation mode decision unit decides that the operation mode comprises that of the DVC.

4. A DSC lens control method for a combination camera combining both a digital still camera (DSC) and a digital video camera (DVC), comprising the steps of:
    (a) checking a position of a DSC lens if electric power is applied to the combination camera; and
    (b) switching the DSC lens to a closed state if the DSC lens is decided to be open when the combination camera is in a DVC picture taking mode.

5. The DSC lens control method as claimed in claim 4, further comprising the step of:
    (c) deciding if an operation mode comprises that of the DSC or the DVC,
    wherein the step (b) further comprises the step of switching the DSC lens to the closed state if the step (c) decides that the operation mode comprises that of the DVC.

6. The DSC lens control method as claimed in claim 5, further comprising the step of:
    (d) turning off the electric power applied to the DSC and the DSC lens if the step (c) decides that the operation mode comprises that of the DVC.

7. A combination camera combining both a digital still camera (DSC) and a digital video camera (DVC), comprising:
    a storage unit for storing an open or a closed state of a DSC lens while in an operation mode comprising that of the DSC;
    a state decision unit for deciding the state of the DSC lens through the storage unit if electric power is applied while in an operation mode comprising that of the DVC; and
    a switching unit for switching the DSC lens to a closed state if the state decision unit decides that the DSC lens is open.

8. The combination camera as claimed in claim 7, wherein the storage unit comprises an electrically erasable and programmable ROM (EEPROM).

9. The combination camera as claimed in claim 8, wherein the switching unit is configured to switch the DSC lens to the closed state by applying the electric power to the DSC.

10. A DSC lens control method for a combination camera combining both a digital still camera (DSC) and a digital video camera (DVC), comprising the steps of:
    (a) storing an open or a closed state of a DSC lens while in an operation mode comprising that of the DSC of the combination camera;
    (b) deciding the state of the DSC lens based on information stored in the step (a) if electric power is applied while in an operation mode comprising that of the DVC; and
    (c) switching the DSC lens to the closed state if the step (b) decides that the DSC lens is open.

11. The DSC lens control method as claimed in claim 10, wherein the step
    (a) further comprises the step of storing the open or closed state of the DSC lens in an EEPROM.

12. The DSC lens control method as claimed in claim 11, wherein the step (c) further comprises the step of switching the DSC lens to the closed state by applying the electric power to the DSC.

13. The combination camera as claimed in claim 1, wherein,
    the lens position check unit checks an open state of the DSC lens by checking whether the DSC lens is zoomed in or out, and
    if the DSC lens is determined to be zoomed in, the lens position check unit decides that the DSC lens is open, and if the DSC lens is determined to be zoomed out, the lens position check unit checks whether an iris of the DSC lens is open or closed.

14. The DSC lens control method as claimed in claim 4, further comprising the steps of:

checking an open state of the DSC lens by checking whether the DSC lens is zoomed in or out, and if the DSC lens is determined to be zoomed in, deciding that the DSC lens is open, and if the DSC lens is determined to be zoomed out, checking whether an iris of the DSC lens is open or closed.

* * * * *